United States Patent [19]

Knowles

[11] Patent Number: 4,575,625
[45] Date of Patent: Mar. 11, 1986

[54] INTEGRAL HAND-HELD LASER SCANNER

[76] Inventor: Carl H. Knowles, 425 E. Linden St., Moorestown, N.J. 08057

[21] Appl. No.: 536,404

[22] Filed: Sep. 27, 1983

[51] Int. Cl.⁴ .............................................. G06K 7/10
[52] U.S. Cl. .................................... 235/467; 235/470; 235/472; 250/271; 307/117; 350/6.5; 372/24
[58] Field of Search ....................... 235/467, 470, 472; 250/271; 372/24; 350/6.5; 307/117, 326

[56] References Cited

U.S. PATENT DOCUMENTS

4,031,560  6/1977  Maresh ........................... 307/117 X
4,387,297  6/1983  Swartz et al. .................... 235/472 X Primary Examiner—David L. Trafton

[57] ABSTRACT

A portable, hand-held laser scanner system located within a compact housing. The housing includes a laser tube power supply means therefor and computer means. The laser is operative when triggered by the user to produce a laser beam which exits the housing to scan a target, such as a bar code symbol, located adjacent thereto and to receive light directed from the target. The computer is arranged for decoding the reflected signal. Communication means are provided within said housing to provide data output signals. The computer is arranged to control and override the operation of the laser when the amount of laser light produced within a predetermined period of time reaches a predetermined threshold value and for enabling the laser to operate when the amount of laser energy produced is less than the predetermined threshold value within the predetermined period of time.

22 Claims, 4 Drawing Figures

INTEGRAL HAND-HELD LASER SCANNER

BACKGROUND OF THE INVENTION

This invention relates generally to laser scanners and more particularly to integral hand-held laser scanners.

Laser scanners have been disclosed in the patent literature and some are commercially available for use in reading bar codes, such as the Uniform Product Code (UPC). Such scanners commonly make use of a laser tube mounted in a scanning head adapted to be mounted or held over the bar code symbol to be scanned. The laser tube generates the laser light beam which is directed through an optical assembly out of the head to impinge the symbol. In most applications the exiting laser beam is caused to quickly move across (traverse) the symbol while the device's head is held stationary with respect to the symbol. The optical assembly is arranged to provide proper focusing of the beam to get maximum depth of field with appropriate beam width in order to resolve the bars making up the bar code over a working distance, i.e., the distance between the bar code and the head. The laser beam traversing the bar code is reflected off the material on which the code is printed. If that material is not spectral, e.g., is paper, the light reflects and scatters in all directions in an evenly distributed fashion off of the material. Some of that reflected light scatters back into the laser scanning head and associated optical components for receipt by a photocell and associated signal processing components. The photocell and the associated signal processing components produce electrical signals indicative of the detection of the bars making up the code. This signal is then digitized for use by associated decoding circuitry to provide a signal indicative of the information contained in the code.

As is known, the Federal Bureau of Radiological Health has defined five classes of laser devices, four of which classes require some type of labeling on the devices themselves. Such classes are generally defined on the basis of power output of the devices, with the more powerful laser devices requiring a higher degree of warning on the label. For example, the lowest power category is a Class 1 laser device. Such a device does not present any threat to health or safety and therefore does not require any label whatsoever. Class 2 laser devices, that is devices of the next higher power category are classified to be of a minimal hazard and thus require a label. However, the label required is a simple cautionary one bearing the symbol of a starburst and the words "Caution: Do not stare into the beam". A Class 3 laser is one which is of substantially higher power and which poses a distinct ocular hazard but no hazard to other parts of the body and thus has to bear a "DANGER" type of label. Classes 4 and 5 type lasers are increasingly hazardous and thus require total constraint so that the beam cannot escape for exposure to the human body.

Laser scanners which include hand-held scanning heads for use in reading bar codes, by their unconstrained nature, have the potential for exposing operation personnel or others to the scanning laser beam. Accordingly, it is desirable to make such scanning devices of sufficiently low power so as not to present any exposure hazard. Obviously, in this regard, it is preferable to produce a device which falls into the Class 1 category. However, as will be appreciated by those skilled in the art, the problem with using such low-powered lasers is that they produce such a small amount of light for reflection off the bar code, that they would require either very large optical components or would have to include very sensitive signal processing means to overcome the severe signal-to-noise ratio problems inherent in low reflected light situations.

OBJECTS OF THE INVENTION

Accordingly, it is the general object of the instant invention to provide a small, hand-held portable laser scanner which overcomes the deficiencies of the prior art.

It is a further object of the instant invention to provide a small, portable laser scanner which is of sufficiently high power to enable expeditious detection of bar codes but which does not present any exposure hazard to users.

It is a further object of the instant invention to provide in a portable hand-held laser scanner computer means for controlling operation of the device to ensure that the power output does not exceed a maximum predetermined value output in a predetermined period of time.

These and other objects of the instant invention are achieved by providing a portable hand-held laser scanner comprising a housing, laser generation means, power supply means, user actuable means and control and override means. The laser generation means and the control and override means are located within the housing. The laser generation means is arranged when operative to produce a laser beam. The power supply means is also located within the housing and is arranged to energize the laser generator means. The actuable means is arranged for actuation to cause the laser to operate. The control and override means automatically precludes operation of the laser when the amount of laser energy produced within a predetermined period of time reaches a predetermined threshold value and enables the laser to operate when the amount of laser energy produced is less than the predetermined threshold value within the predetermined period of time.

Other objects and many of the attendant advantages of this invention will be readily appreciated as the same becomes better understood by reference to the following detailed description when considered in connection with the accompanying drawing wherein:

DETAILED DESCRIPTION OF THE PREFERRED EMBODIMENT

Figure 1:
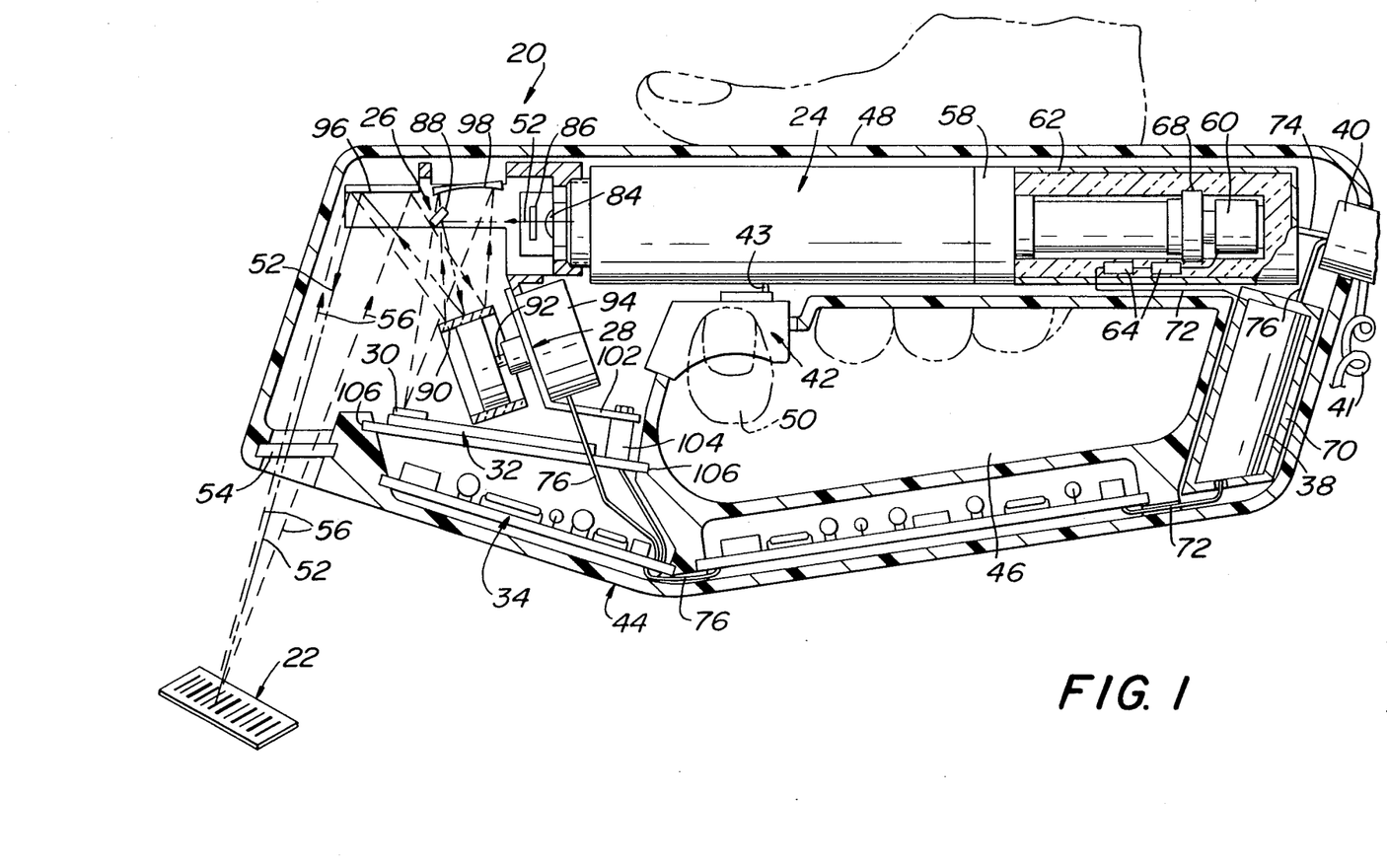
FIG. 1 is a side elevational view, partially in section of a laser scanner constructed in accordance with the instant invention shown in operational relationship with a bar code being read thereby.

Referring now in greater detail to the various figures of the drawing wherein like reference characters refer to like parts, there is shown at 20 in FIG. 1 a portable, hand-held laser scanning terminal which is completely contained and includes means for scanning a bar code 22, power supplies, a decoding computer to provide a signal indicative of the information contained in the bar code and communications capabilities to enable the uploading/downloading of data to and from the terminal. Thus, the device 20 basically comprises a laser tube 24, an optical bench assembly 26, a rotating reflective polygon and associated motor assembly 28, a photodetector 30 and associated amplifier and signal processing circuitry 32, low voltage power supply circuitry 34, a microprocessor and associated component circuit board 36 (collectively referred to as a "computer"), a high voltage or "laser" power supply 38, a releasable input/output cable connector or plug 40, an associated input/output cable 41, and an on/off trigger assembly 42, all mounted within or to a housing 44.

The housing 44 is compact in size and is ergonomically designed to be held comfortably within one's hand for long periods of time. To that end, as shown in FIG. 1, the housing 44 includes a finger opening 46 located below a barrel-type hand-grip portion 48. Thus, the device 20 is held in the hand (shown in phantom in FIG. 1) by extending the fingers through the opening 46, with the index finger 50 resting on the trigger 42. A microswitch 43 is coupled to the trigger. In accordance with a preferred embodiment of the invention, the housing is formed of a lightweight, impact resistant, strong, plastic material.

The detailed operation of the device 20 will be described later, suffice it for now to state that upon actuation of the trigger mechanism 42 by the user and under the control of the computer circuitry, the laser assembly 24 produces a laser beam 52, whose path is directed by the optical assembly 26 and rotating reflective polygon assembly 28 through an outlet window 54 (FIG. 2) in the housing for impinging upon a bar code 22 disposed a short distance, (e.g., two to twelve inches) thereunder. The operation of the rotating reflective polygon, as will be described later, causes the beam to sequentially traverse across the bar code in a single direction. The laser beam is thus reflected by the bar code's bars and spaces in a generally uniform spectral distribution so that a portion of the reflected light enters back through the window 54 in the path shown by the "return" arrows 56. This returning light passes through the optical assembly and is reflected off the rotating polygon so as to be directed to the photo-detector 30. The photo-detector 30 and associated amplifier and signal processing means 32 produce digital signals indicative of the makeup of symbol 22. These digital output signals are conventional "TTL type" logic signals of from zero to five volts and are then decoded by the microprocessor and associated circuitry 32 to provide conventional RS232C signals (e.g., ASCII characters) via the output connector 40 and cable 41 to any desired peripheral equipment, e.g., a host computer, an electronic cash register, a memory bank, a modem, a printer, etc. Moreover, the output data signals can be extended up to 4800 baud and may be used for light pen emulation.

The device 20 is capable of scanning at a very fast scan rate, e.g., 150 scans per second, for decoding various conventional bar codes, e.g., UPC Type A, D, E, EAN, located from ½ inch to 6 inches from the window. The width of the scan field is approximately 2.3 inches at the window and 6.5 inches at a distance of 6 inches from the window. The depth of field is very deep, e.g., 15 inches. The device 20 is light in weight, e.g., approximately 15 ounces, and compact in size, e.g., approximately 10½ inches long by 4 inches high by 3.2 inches deep.

Power for the device 20 can be provided either by a 115 volt AC power pack (not shown), or a 24 volt battery-powered pack (not shown) including rechargeable batteries, or by +22 to +32 volts DC from a host terminal (not shown) via the cable 41. In the embodiment shown herein, the device 20 is powered by +22 to +32 volts DC via input lines 76 in the cable 41 (See FIG. 2). The cable 41 also serves as the means for grounding the components of device 20 as well as providing the means for carrying the data signals between the device 20 and any device to which it is connected.

The constructional details of the device 20 will now be described. The laser assembly 24 basically comprises a steel-surround laser tube 58 whose ceramic rear end anode portion 60 is located within a protective steel encased insulative shield 62. A ballast resistor assembly 64 is also located within the high voltage anode shield 62. The high voltage anode portion of the laser tube is electrically isolated from the device 20 via an electrically insulative layer 66 within the shield 62. The insulative layer 66 includes an annular recess 68 adapted to receive the annular flange of the laser's anode portion to snap-fit in place thereover and thereby hold the shield 62 securely in place.

Figure 2:
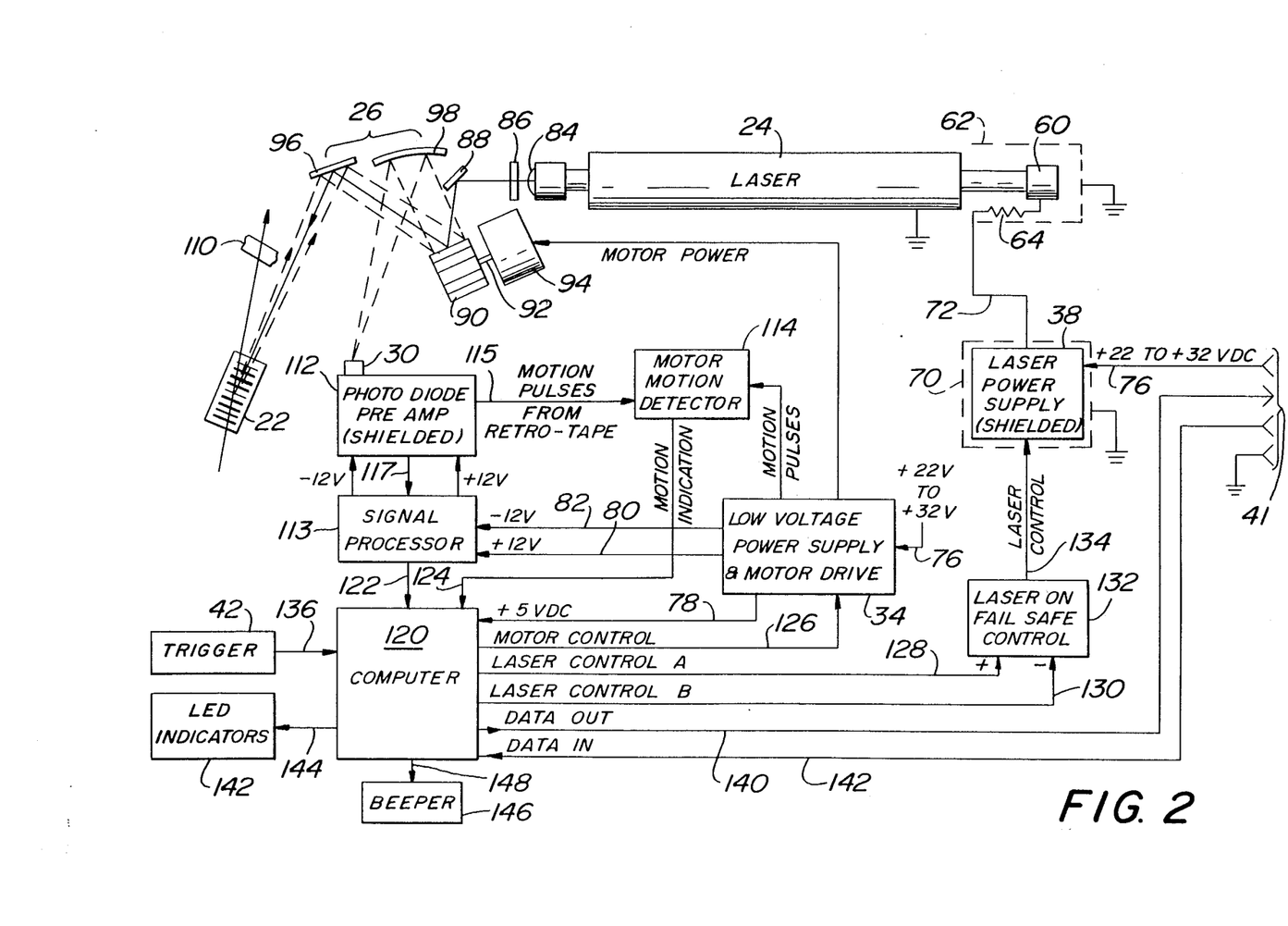
FIG. 2 is a combination schematic and block diagram showing the functional relationship of the various components making up the device shown in FIG. 1.

The high voltage laser supply 38 is of generally conventional, switch mode design and is in the form of potted circuit board enclosed in a metal housing or shield 70 located in the rear portion of the plastic housing 44. The high voltage supply is electrically interconnected to the ballast assembly 64 via a heavily shielded conductor 72. The ballast assembly comprises plural ballast resistors connected in series in line 72 to the anode 60. The anode shield tube 62 is grounded via a conductor 74 extending to the input/output connector 40 and associated ground line of cable 41. As can be seen in FIG. 2, the line 76 carrying the +22 VDC to +32 VDC is also connected to the low voltage power supply board 34 and motor drive portion of assembly 28. The metal shielding on the laser tube 24, the metal shield 62 on the laser tube's anode and the metal shield on the laser power supply 38 are all grounded (see FIG. 2). The +5 volts DC bias for the microprocessor (computer) is provided by a conductor 78 (FIG. 2) from the low voltage power supply portion of board 34. A ±12 volt DC bias is provided from the low voltage power supply to the signal processor and to the photo diode preamplifier (to be described later) on the circuit card 32, via conductors 80 and 82, respectively (FIG. 2).

As will be appreciated by those skilled in the art, the use of the metal shield with the built-in ballast resistors provides a protective grounded cover over the anode (high voltage portion) of the laser tube to protect the operating personnel from shock in the event that the plastic housing 44 is pierced by a sharp metal object attempting to contact the anode. The grounded metal shield on the high voltage power supply 38 also serves the same protective purpose. The conductor 72 shown in FIG. 1 is only shown schematically and in practice consists of a heavily insulated conductor, also in the interest of shock protection.

The laser tube 58 includes an output window in the form of a lens 84 for shaping the beam 52 and for directing it through a variable attenuator 86. The optical assembly 26 is arranged to operate in conjunction with the reflective polygon (to be described in detail later) to compress the beam path into a tightly constrained area for maximum shock resistance. This feature ensures that the optical path both outgoing and returning from the bar code, remains aligned irrespective of a shock being imparted to the device. The output lens 84 also focuses the laser beam to provide the maximum depth of field within the appropriate beam width to enable resolution of the bars making up the bar code symbol 22 over the working distance of the device (that is, the range of distances from the bar code to the device). Thus, the optical bench assembly 26 includes a small angularly mounted mirror 88 which directs the beam 52 to the reflective polygon. The reflective polygon comprises a dodecahedron (12-sided) polygon 90. Each face of the polygon 90 includes a planar-mirrored surface which is arranged to reflect both the outgoing and incoming light. The polygon 90 is mounted on a rotary output shaft 92 of a small electrical motor 94. Power for the motor is provided via line 83 from the low voltage supply 34. Both the low voltage power supply 34 and the high voltage (laser) power supply 38 are preferably constructed to utilize high frequency (e.g., 100 KHz) switch mode techniques in the interest of compactness and weight reduction.

The motor, when operated as will be described later, causes the polygon to rotate at a fixed speed, e.g., 720 r.p.m., whereupon the outgoing beam 52 (as directed by mirror 88) to each planar surface is reflected in a unidirectional sweeping motion across a fixed mirror 96. The sweeping beam 52 is reflected off mirror 96 through output window 54. That window is located in the bottom of the front of the housing 44 and is in the form of an elongated, transversely extending glass covered slot or window. The laser beam exits the window to sweep across the bar code 22 located below the device. A portion of the returning light from the bar code 22, and which is represented by the reference numeral 56, enters back through the window 54 onto the mirror 96 and from there is directed to the rotating polygon 90. The faces of rotating polygon 90 reflects the light to a concave mirror 98 which focuses the collected light onto the photo-detector 30.

In the interest of maintaining the critical optical alignment, the mirrors 88, 96 and 98 and the variable attenuator 86 are all rigidly mounted on a support bracket 100 affixed to the front end of the laser tube. The bracket 100 includes a flanged mounting bracket 102 on which the motor 94 is mounted. The bottom end of the bracket 102 is secured to the photo-detector, amplifier and signal processing board 32, via a bolt mounting stand-off 104. The card 32 is itself held in place within the housing via a pair of elongated mounting slots 106 in the inner surfaces of portions of a wall forming the housing 44.

As should thus be appreciated by those skilled in the art, once the optical assembly is aligned and mounted as just described, it does not utilize the device case 44 for its support but only as a nest therefor. This feature is of considerable importance from the standpoint of maintaining optical alignment and hence operating efficiency of the device.

The electrical details of the signal processing means to convert the light received by the photocell into digital signals indicative of the bar code scanned are generally conventional and will not be described in detail herein. However, suffice it to say that the light received by the photocell results in the production of output signals in the nanoamp range. These signals are amplified by a photodiode preamplifier 112 (FIG. 2) to several volts and provided via line 117 to the signal processor 113 where they are digitized by threshold detecting means therein. Such means take the first derivative of the input voltage and the second derivative of the offset to provide a conventional five volt TTL logic signal output. Thus, for each bar of the bar code, the signal processor produces five volt logic output and for each space it produces a zero or ground output.

In order to ensure that when the device 20 is in operation the laser beam does sweep across the output window 54 (and, hence, across the bar code 22 to be scanned) and is not stationary, a strip of highly reflective tape 110 (FIG. 2) is mounted within the housing 44 of the device immediately to the side of the window 54. The beam overscans the window but the tape is positioned within the sweep range of the beam so that upon each sweep of the beam 52, the beam impinges the tape. Being highly reflective, the tape serves to reflect the beam back to the mirror 96 and the associated components of the optical assembly. Thus, each time the beam sweeps across the tape, a burst of much more intense light is received by the photocell 30 than is received from the bar code 22. This intense returning light signal and the associated higher output of the photocell is sensed by the photodiode preamplifier 112 of the signal processing card to provide electrical output signal to serve as a means to detect motor motion, i.e., if the beam is being swept. In this regard, the device 20 is arranged to turn the laser off in the event that it does send a strong returning light signal from the retroreflective tape every seven or eight milliseconds. Such action is necessary in order to meet the requirements of the Bureau of Radiological Health which requires that if a laser scanner's motor fails, the laser must be turned off. Accordingly, the large signals from the photodiode preamp 112 (which indicate the receipt of the high intensity light from the retroreflective tape 110) are provided via line 115 to motor motion detecting means 114. Such means can be part of the circuit card 32 or can take various other forms, such as an RC time constant circuit and an associated Schmitt Trigger. Further alternative techniques for detecting motor motion are to utilize the motor motion detection circuit 114 in response to the motion pulses of the motor itself.

In the schematic diagram of FIG. 2, the two alternative means of detecting motor motion, namely detecting motion pulses from the retroreflective tape 110 and detecting motion pulses from the motor itself, are shown schematically as inputs to the motor motion detector 114.

The output signals from the signal processor 113 are provided via line 122 to the computer (microprocessor card 36). This card is arranged to do all of the processing necessary for decoding the bar code signals and to provide the decoded signals in the form of conventional asynchronous serial ASCII output to any desired associated peripheral components via the output connector 40 and associated cable 41. Moreover, the computer can be programmed for other management functions, e.g., reading a symbol and comparing it with a previously read symbol for verification purposes, downloading information from a host computer into the microprocessor to perform high speed, on-line management functions, etc.

Finally, in accordance with one of the primary aspects of the subject invention, the microprocessor and its associated means serves to control laser power, that is, integrated on-time and integrated off-time to ensure that the use of the scanner 20 does not exceed Bureau of Radiological Health laser class limits, e.g., Class 1 and Class 2(a) limits.

As is known by those skilled in the art, for a Class 1 laser product the Bureau of Radiological Health allows 0.3 watts of power to enter a seven millimeter circle during each 10,000 second period of time. At 200 optical path millimeters away from the polygon (which is approximately the distance of focus of the human eye) using a 200 microwatt laser, one could provide 0.056 microjoules per scan. Thus, with such a laser for Class 1 operation the device could make 69,600 scans in the 10,000 seconds.

In accordance with one of the primary aspects of the subject invention, the computer of device 20 is arranged for determining how many of the available scans per predetermined time period are still available for use. Inasmuch as the passage of time increases the amount of scans available, the computer is programmed to provide software counters (referred to colloquially hereinafter as "gas tanks") and which are continuously adjusted in accordance with elapsed time and laser use to provide a precise indication of the number of scans available at any instant of time. Thus, the device 20 includes a first software-based up-down (identified in FIGS. 3 and 4 as "tank one") and a similar second up-down counter (identified in FIGS. 3 and 4 as "tank two"). Whenever the scanner 20 is connected to a power source (such as by the connection of plug 40 and associated cable 41 being connected to a source of +22 to +32 volts DC) the "gas tank" counters commence counting. Thus, when the device is powered the tank one counter counts up with elapsed time and counts down when the laser is on. The tank two counter behaves inversely. The operation of the gas tanks is set forth in considerable detail later with reference to FIGS. 3 and 4, suffice it for now to state that as time elapses with the laser off tank one counts up and tank two counts down, thereby filling and emptying the tanks, respectively. Conversely, when the laser is on (whereupon scans are being used) tank one counts down and tank two counts up.

In order to effect the counting operation (either up or down) with elapsed time, the computer 120 includes an internal clock which is utilized by the counters. Output signals from the signal processor indicative of operation of the laser are provided via conductors 122 to the computer 120. Signals indicative of detected motor motion from the motor motion detector 114 are provided via lines 124 to the computer. The computer 120, in response to the signals from the signal processor 122 and motion detector 114 and as a function of the counts in the gas tanks, provides signals via line 126 to the low voltage power supply and motor drive 34. Thus, if the laser device 22 has been run too long to exceed the permissible number of scans in a predetermined period of time, the computer 120 provides signals via line 126 to de-energize the motor drive.

The use of two counters (each going in the opposite direction) provides a redundancy check of proper operation. In this regard, the computer 120 provides one control signal via line 128 in response to the count in one counter and provides another control signal via line 130 in response to the count in the other counter. The signals appearing on lines 128 and 130 are provided to a failsafe control circuit 132 on the microprocessor board 36 and which control performs an AND-like function. In this regard, in the event that the signals on the lines 128 and 130 show that one counter is indicating sufficient counts for laser operation while the other counter indicates insufficient counts for laser operation (an obvious component or software failure situation) the failsafe control 132 produces a control signal on line 134. This line serves as an input to the laser power supply 38 and acts to disable the power supply in the event of a fault condition. If, on the other hand, there is no hardware or software failure and if there are sufficient scans available to enable the laser to be turned on, the signals appearing on lines 128 and 130 cause the failsafe control to enable the laser power supply via line 134.

The operation of the device 20 is, as mentioned heretofore, effected by the depressing of the trigger 42. This action causes microswitch 43 to provide a signal via line 136 to the computer 120. The signals from the signal processor, and representing the bar code to be decoded are also provided to the computer via lines 122.

As will be set forth in detail later, the device 20 also includes an LED indicator (mounted on the case 44 and shown schematically at 142 in FIG. 2). The LED indicator 142 is arranged to be illuminated under the control of the computer 120 via line 144 upon the completion of a good scan, i.e., the recognition of the bar code scanned. The device 20 also includes an annunciator or beeper 146 which is controlled by the computer via line 148 and to provide an audible sound each time a good scan is achieved or in the event of misuse of the device, as will be described hereinafter.

Figure 3:
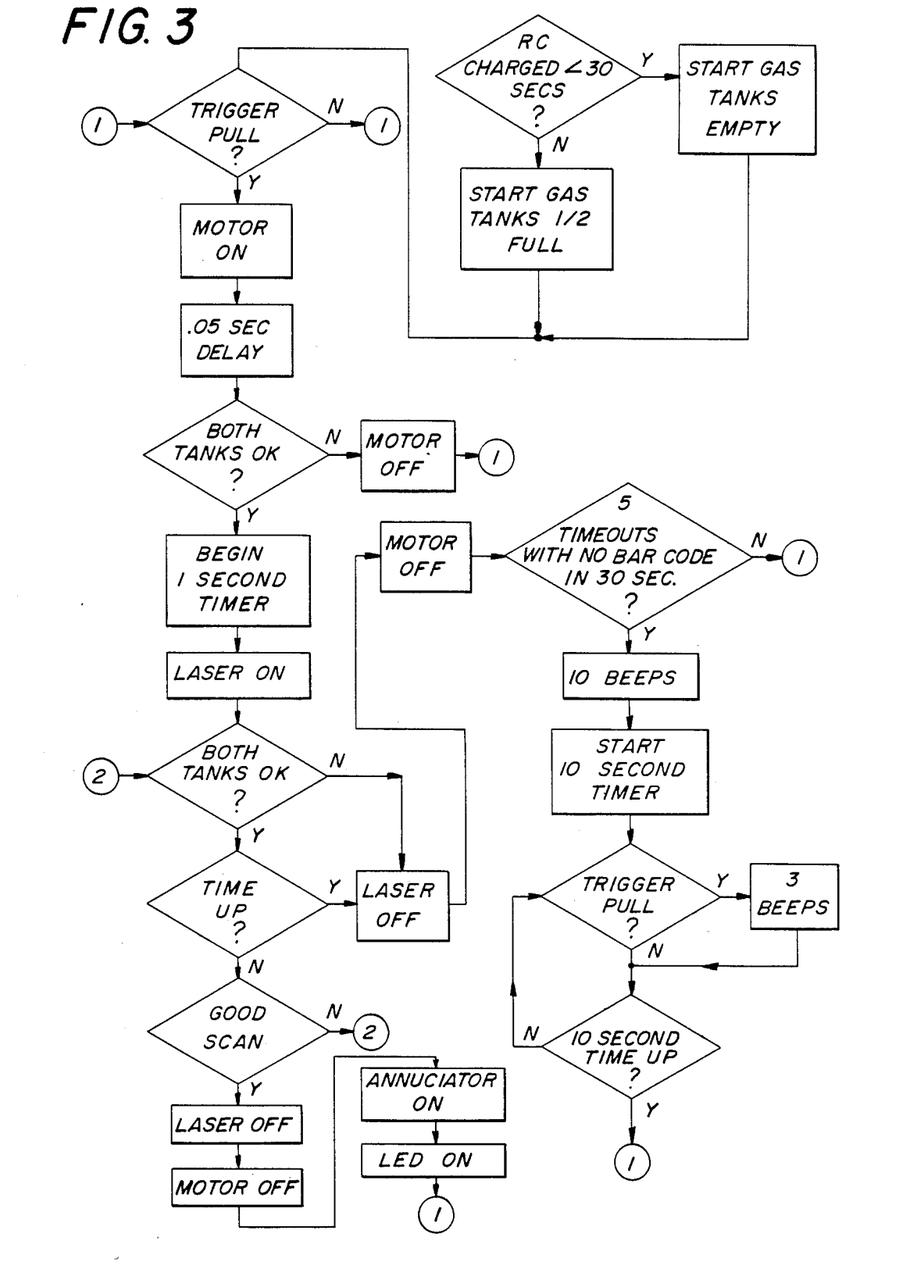
FIG. 3 is a flow chart showing the operation of the device shown in FIG. 1.
Figure 4:
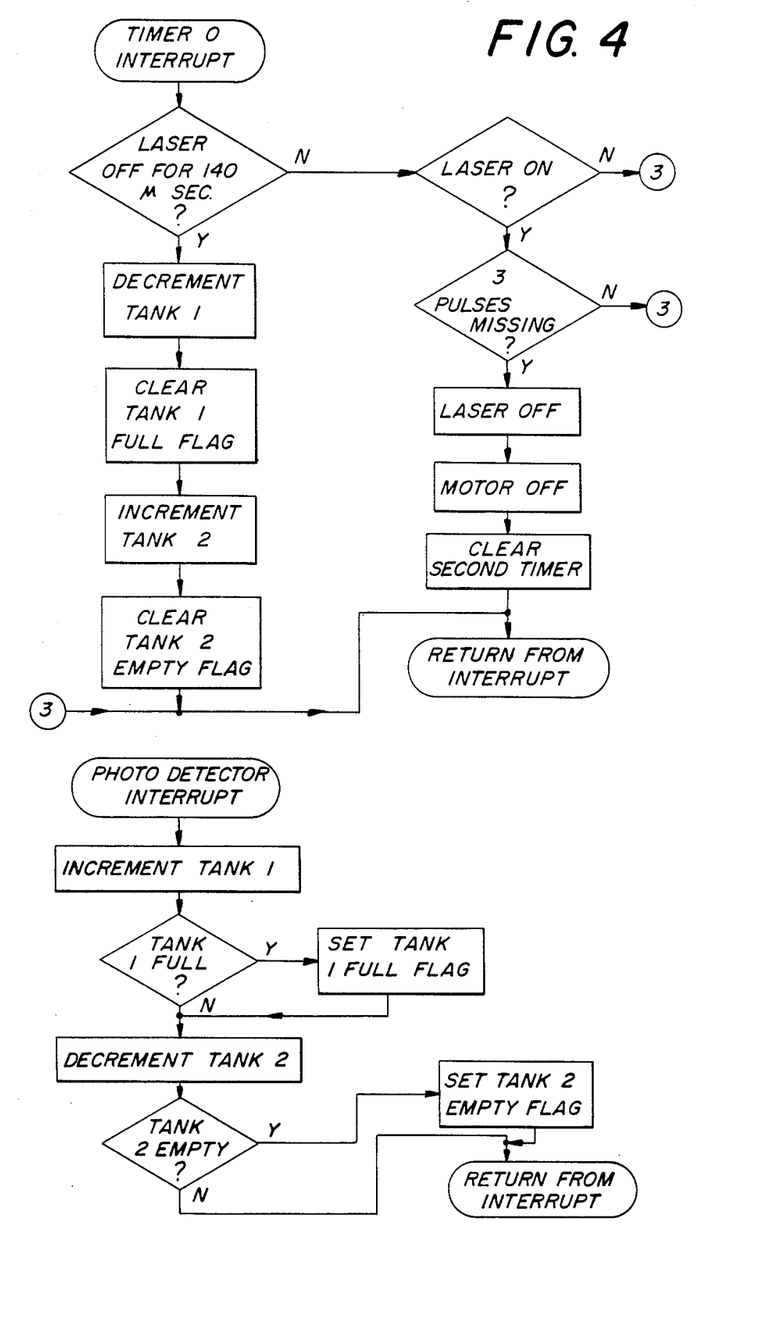
FIG. 4 is a flow chart showing two "interrupt" cycles included in the flow chart shown in FIG. 3.

Referring to FIGS. 3 and 4, the overall operation of the portable laser scanner will now be described.

Assuming that the device had been turned off (e.g., unplugged) with its "gas tanks" empty, operation is as follows: A microprocessor monitors an RC timing circuit (not shown). The time constant of the RC circuit is 30 seconds. If there is no charge on the RC timing circuit (as indicated by the arrow bearing the legend N), the device 20 is enabled to be started with its "gas tanks" half full upon the pulling of the trigger. In the event that there is still some charge on the RC circuit, thereby indicating that the device had not been off for at least 30 seconds, this condition, indicated by the the arrow bearing the legend Y, enables the device to go into the "start with gas tanks empty mode". In either case, the microprocessor monitors the condition of the trigger of the device 20. If the trigger has not been pulled, the device waits for a trigger pull. If the device trigger has been pulled, as indicated by the arrow bearing the legend Y, the motor is turned on. There is a delay of 50 milliseconds to allow the motor to come up to speed. The microprocessor monitors both gas tanks. If the output signals from both tanks are not as desired, indicated by the arrow bearing the legend N, the motor is turned off and the system returns to the status position awaiting a trigger pull. If the output signals from both tanks indicate a proper condition, represented by the arrow bearing the legend Y, the system starts counting for one second and turns the laser on. The one second time period is provided to enable the system to have sufficient time to sense a good bar code symbol. The maximum one second time interval will permit the device to produce roughly 150 scans across the bar code symbol.

As the laser scans across the bar code during the one second interval, the microprocessor then continues to monitor the gas tanks. If the condition of both tanks is such as to indicate that there is a sufficient number of counts available to enable the laser to remain on, (the condition indicated by the arrow bearing the legend Y)

the laser remains on and the scanning process continues. The microprocessor then determines if the one second time interval has elapsed. If not, as indicated by the arrow bearing the legend N, the microprocessor determines if a good scan has been accomplished. By a "good scan" it is meant that the bar code has been recognized by the microprocessor circuitry. If a good scan has not occurred, a condition indicated by the arrow bearing the legend N, the system returns or loops back to recheck the condition of both gas tanks. Thus, the system continues to loop checking the amount of time elapsed, the condition of the tanks and the existence of a good scan. In the event that the tanks are empty or are providing spurious signals (indicated by the arrow bearing the legend N) or the elapsing of the one second time interval (indicated by the arrow bearing the legend Y) the laser is immediately turned off and the motor is turned off. The microprocessor then determines if there had been five time outs (turning the laser off) without having successfully read a bar code in 30 seconds, which condition could occur if someone were using the device 20 for purposes other than reading a bar code, e.g., as a laser toy, etc. If such is the case (as is indicated by the arrow bearing the legend Y) the system then produces 10 audible beeps to warn the user to use the device properly. At the same time, the microprocessor initiates the start of a 10 second timing function to disable the device for that period of time. Thus, if the trigger is pulled after the start of the 10 second timer (which condition is indicated by the arrow bearing the legend Y) the device beeps three times to again warn the operator to use the device properly. The microprocessor then checks to see if the 10 second time interval is up. If it is, the system goes back to monitor the trigger to determine if it has been pulled. If the 10 second time interval has not elapsed (the condition indicated by the arrow bearing the legend N) the system goes to "wait" loop monitoring the condition of the trigger.

In the event that a good scan is detected before the one second timer has timed out (the condition being shown by the arrow bearing the legend Y) the laser is turned off, the motor is turned off, the annunciator (beeper) sounds and an LED illuminates for approximately 200 milliseconds to indicate to the user that a good scan has been accomplished. The system then loops back to monitor the condition of the trigger, that is, determine if the trigger has been pulled to initiate a new scanning operation.

The incrementing of one of the "gas tanks" and the decrementing of the other of the "gas tanks" and viceversa is effected during a photo detector interrupt cycle approximately every seven milliseconds that the laser is on. As noted earlier, as the laser scans across the field, its beam impinges highly retroreflective tape. The reflected signal is picked up by the signal processor and this signal is used by the microprocessor as an interrupt signal. The interrupt signal is used by the microprocessor to cause it to enter its photo detector interrupt routine.

As noted earlier, the two "gas tanks" are preferably software counters (although they could be hardware counters), with one counter being incremented and the other tank being decremented during operation. Due to the fact that the rotating polygon includes 12 mirrored faces, there are 12 interrupts (increments or decrements) for each rotation of the motor's output shaft. Thus, with a motor speed of 720 rpm the two software counter "gas tanks" are incremented and decremented approximately each seven milliseconds.

Operation of the photo-detector interrupt is shown at the bottom of FIG. 4 and is as follows: Upon the detection of the burst of reflected light from the retroreflective tape, the photo detector interrupt cycle starts. This causes the incrementing of the "tank one" counter. This counter is then checked to see if full. If the tank is full (the condition indicated by the arrow bearing the legend Y) the tank one "full" flag is set. If tank one is not full, (which condition is indicated by the arrow bearing the legend N) or after the tank one full flag is set, tank two is decremented by one count. The condition of the tank two counter is then checked. If the tank two counter is empty (which condition is indicated by the arrow bearing the legend Y) the tank two empty flag is set and there is a return from the interrupt. Alternatively, if tank two is not empty (as indicated by the arrow bearing the legend N) the tank two empty flag is not set before the return from the interrupt. The setting of the tank one "full" flag and the tank two "empty" flag is utilized in the portion of the routine shown in FIG. 3 where the tanks are checked, that is, the decision block bearing the legend "both tanks okay?".

At the top portion of FIG. 4, there is shown the "timer zero interrupt routine". It is this routine which causes the incrementing and decrementing of the two gas tank counters when the laser is on. This interrupt routine is responsive to a constantly running counter or timer in the microprocessor. The counter initiates the "timer zero interrupt" routine when it "overflows". This occurs every 10 milliseconds whether the laser is on or off. At the start of the timer zero interrupt, it is determined whether or not the laser has been off for 140 milliseconds (14 times through the timer zero interrupt loop). If such is the case (the condition indicated by the arrow bearing the legend Y) the tank one counter is decremented by one count, the tank one "full" flag is cleared, the tank two counter is incremented by one count and the tank two "empty" flag is cleared. The system then returns from the interrupt. If, on the other hand, the laser has not been off for 140 milliseconds (which condition is indicated by the arrow bearing the legend N) the present condition of the laser is checked. If the laser is not on (which condition is indicated by the arrow bearing the legend N) the system returns from the interrupt. If, on the other hand, the laser is on (which condition is indicated by the arrow bearing the legend Y) the system then monitors the reflected signals from the retroreflective tape. If three pulses are missing, that is, the system does not detect three pulses in a period of time that such pulses should be received from the retroreflective tape (thereby indicating that either the laser is not working, although it should be, or that the polygon is not rotating) a condition indicated by the arrow bearing the legend Y, the laser is turned off, the motor is turned off and the one second timer in the detect loop is cleared. The system then returns from the interrupt.

While the control of the on and off time of the laser, as described heretofore is effected via a microprocessor based control, such control could be accomplished with other electronic means, such as analog integrators, adders, etc. However, such an approach is not preferred inasmuch as the computer provides a relatively low-cost, precise and accurate digital control for the system. Moreover, by utilizing a computer within the device itself (as opposed to the use of a control computer located externally of the device and coupled to the device via the input/output cable or cord) the device 20 can be made completely portable. Another advantage of putting the computer in the device's housing 44 is that it is less subject to electromagnetic and electrostatic interference. Furtherstill, the utilization of the computer in the housing 44 tends to reduce signal transmission distances thereby rendering the system less susceptible to errors due to noise spikes. Such spikes could present a problem in the decoding operation. Once the signals have been decoded by the computer and its associated components, the output signals are converted to decoded ASCII characters for transmission via cord 41 to a host or peripheral device. As will be appreciated by those skilled in the art, the ASCII method of communication is substantially less sensitive to noise.

Thus, as will be appreciated from the foregoing, the device 20 is a complete, self-contained laser bar code scanning system. Scanning, decode and communications functions are provided by the device through its onboard computer. In a preferred embodiment the microprocessor and associated components are formed using advanced VLSI microcircuits. Moreover, the ergonomically designed head and its shock resistantly critically aligned components facilitates non-contact scanning and real time decoding by providing a lightweight unit which does not require critical aiming position by the operator for continuous scanning, thereby minimizing operator fatigue. The large depth of field provided by the unit renders the device suitable for reading all popular industrial bar code symbols and delivers both audible and visual indications of successful reads. The hard-seal steel-ceramic laser tube with its steel shell protected anode and its shielded high voltage power supply provides a high degree of personnel protection from shock dangers.

The microprocessor based control system for ensuring that the operation of the device does not exceed permissible limits enables the device to utilize a higher powered laser than otherwise possible, thereby enabling the device to be small and light in weight due to the minimization of signal to noise problems inherent in low powered lasers, while still providing the safety inherent in very low powered lasers.

Without further elaboration, the foregoing will so fully illustrate my invention that others may, by applying current or future knowledge, readily adapt the same for use under various conditions of service.

I claim:

1. A portable, hand-held laser scanner comprising a housing, laser beam generation means, power supply means, user actuable means for initiating operation of said scanner and control and override means, said laser generation means, said power supply means and said control and override means being located within said housing, said laser generation means being arranged when operative to produce a laser beam which exits said housing for scanning across a target located adjacent said scanner, said scanner being arranged to receive light reflected off said target and for providing signals indicative thereof, said power supply means being arranged to energize said laser generation means, said actuable means being arranged for actuation by said user to cause said laser generation means to operate, said control and override means automatically precluding operation of said laser generation means when the amount of laser energy produced within a predetermined period of time reaches a predetermined threshold value and enabling said laser generation means to operate when the amount of laser energy produced is less then said predetermined threshold value within said predetermined period of time.

2. The device of claim 1, wherein said control and override means continuously determines the amount of time available for said laser generation means to operate without exceeding said predetermined threshold value.

3. The device of claim 2 wherein said control and override means comprises computer means for counting the amount of time said laser generation means is operating and for also counting the amount of time said laser generation means is off.

4. The device of claim 3 wherein said computer means comprises microprocessor based means arranged to count in one direction when said laser generation means is operating and in the opposite direction when said laser generation means is off.

5. The device of claim 3 wherein said computer means provides a disable signal when the count reaches a predetermined value, said disable signal serving to preclude operation of said laser generation means.

6. The device of claim 3 wherein said computer means performs first and second counts, said first count being incremented when said laser generation means is operating and being decremented with the passage of time, said second count being decremented when said laser generation means is operating and being incremented with the passage of time.

7. The device of claim 6 wherein said computer means produces a signal for disabling said laser from operating when said first count reaches a first value and said second count reaches a second value.

8. The device of claim 1 wherein said target comprises a bar code symbol and wherein said scanner is arranged to decode said symbol and to provide a signal indicative of said decoded symbol.

9. The device of claim 1 additionally including means located within said housing for causing said laser beam to sweep across a field in which said target is located, said scanner also including means located within said housing for determining if said beam is sweeping when said laser generation means is operative and for disabling said laser generation means if said beam is not sweeping across said field.

10. The device of claim 9 wherein said beam sweep determining means comprises highly reflective means located within said housing in said sweep field for providing a signal each time said beam sweeps across said field.

11. The device of claim 8 wherein said housing also includes means for providing signals to the user to indicate various operating conditions of said scanner.

12. The device of claim 1 wherein said housing includes a hand-grip portion and wherein said laser beam is directed away from said housing under said hand-grip portion to sweep across a field located therebelow and in which said target is located.

13. The device of claim 12 wherein said housing includes rotating reflective means for causing said beam to sweep across said field.

14. The device of claim 12 wherein said laser generation means comprises a laser tube and wherein said device additionally comprises an optical bench assembly integrally mounted on said laser tube and within said housing to maintain optical alignment of said laser beam irrespective of impact to the housing.

15. The device of claim 14 additionally comprising rotating reflective means for causing said beam to sweep across said field.

16. The device of claim 1 wherein said power supply means comprise a laser power supply and a low voltage power supply, each of said power supplies being of high frequency, switch mode-construction.

17. The device of claim 16 wherein said laser power supply is located within a grounded metal shield.

18. The device of claim 17 wherein said laser includes a high voltage anode portion located within a grounded metal shield.

19. The device of claim 18 wherein said housing is formed of a plastic material.

20. The device of claim 1 wherein said laser generation means includes a laser tube having a high voltage anode portion located within a grounded metal shield.

21. The device of claim 20 wherein said grounded metal shield includes electrical insulation between said anode and said shield.

22. The device of claim 21 including ballast resistance means located within said shield.

* * * * *

UNITED STATES PATENT AND TRADEMARK OFFICE
CERTIFICATE OF CORRECTION

PATENT NO.   : 4,575,625
DATED        : March 11, 1986
INVENTOR(S)  : Carl H. Knowles It is certified that error appears in the above-identified patent and that said Letters Patent are hereby corrected as shown below:

Title page, the following should be inserted [73] Assignee:

-- Instruments, Inc., Bellmawr, New Jersey. --

Signed and Sealed this

Twenty-first Day of March, 1989

Attest:

DONALD J. QUIGG

*Attesting Officer*   *Commissioner of Patents and Trademarks*

UNITED STATES PATENT AND TRADEMARK OFFICE
CERTIFICATE OF CORRECTION

PATENT NO. : 4,575,625
DATED : March 11, 1986
INVENTOR(S) : Carl H. Knowles

It is certified that error appears in the above-identified patent and that said Letters Patent is hereby corrected as shown below:

On the title page insert Item [73] Assignee:

-- Metrologic Instruments, Inc., Bellmawr, New Jersey --.

This certificate supersedes Certificate of Correction issued March 21, 1989.

Signed and Sealed this

Eighteenth Day of July, 1989

Attest:

DONALD J. QUIGG

Attesting Officer

Commissioner of Patents and Trademarks